United States Patent [19]
Yamaguchi et al.

[11] 3,907,004
[45] Sept. 23, 1975

[54] LIGHT AND RIGID FIBER GLASS REINFORCED PLASTIC COMPOSITE PIPES

[75] Inventors: Ikutoshi Yamaguchi; Yukimasa Terui; Katsumi Akiyoshi, all of Kodaira, Japan

[73] Assignee: Bridgestone Tire Company Limited, Tokyo, Japan

[22] Filed: June 21, 1973

[21] Appl. No.: 372,449

[30] Foreign Application Priority Data
June 22, 1972 Japan.............................. 47-062720

[52] U.S. Cl. ................. 138/132; 138/118; 156/244
[51] Int. Cl.² ......................................... F16L 11/08
[58] Field of Search ........... 138/144, 141, 172, 129, 138/125, 153, 173, 132, 137; 161/DIG. 4; 156/244

[56] References Cited
UNITED STATES PATENTS

| | | | |
|---|---|---|---|
| 2,614,058 | 10/1952 | Francis ........................... | 138/141 X |
| 3,115,164 | 12/1963 | Vanderbilt...................... | 138/137 X |
| 3,122,171 | 2/1964 | Britton et al................... | 138/122 X |
| 3,183,941 | 5/1965 | Woodell........................... | 138/141 |
| 3,477,891 | 11/1969 | Hawerkamp.................... | 138/144 X |
| 3,547,162 | 12/1970 | Schaerer......................... | 138/125 |
| 3,652,375 | 3/1972 | Johnson.......................... | 138/144 X |
| 3,739,815 | 6/1973 | Rejeski ........................... | 138/122 |

*Primary Examiner*—Richard C. Queisser
*Assistant Examiner*—Daniel M. Yasich
*Attorney, Agent, or Firm*—Sughrue, Rothwell, Mion, Zinn & Macpeak

[57] ABSTRACT

Light and rigid fiber glass reinforced plastic composite pipe consisting of an inner tube formed by winding glass fiber threads impregnated with a thermosetting resin on a mandrel by a filament winding process, a rib wound around the inner tube spirally at an appropriate pitch, said rib being produced by mixing an unsaturated polyester resin, magnesium oxide, a crosslinking agent, a filler and a diluting agent and simultaneously thickening the mixture at a temperature of 20°–60°C, and an outer layer covering the inner tube and the rib, which is composed of glass fiber threads impregnated with a thermosetting resin.

9 Claims, 2 Drawing Figures

FIG_1
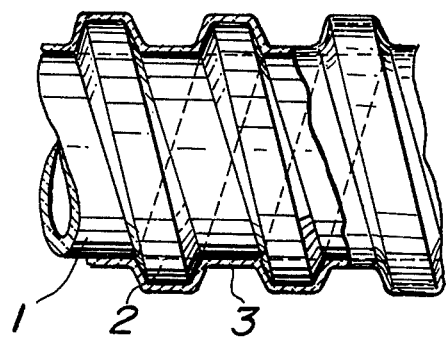
1  2  3
FIG_2
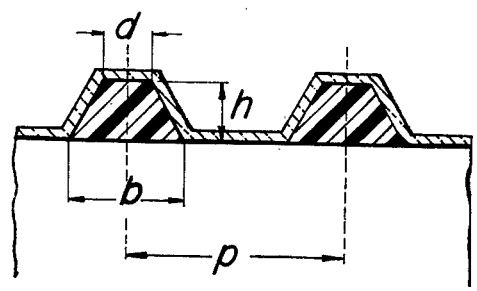

LIGHT AND RIGID FIBER GLASS REINFORCED PLASTIC COMPOSITE PIPES

BACKGROUND OF THE INVENTION

1. FIELD OF THE INVENTION

The present invention relates to a method for producing light and rigid fiber glass reinforced plastic composite pipes provided with a resin concrete rib, efficiently and continuously. The material for forming the rib in the composite pipe according to the present invention is a resin concrete formed by mixing given amounts of an unsaturated polyester resin, a filler, a cross-linking agent, a diluting agent and magnesium oxide and simultaneously thickening the mixture to form a resin concrete, and this material is immediately extruded into a given size of rib. The thus obtained rib is wound continuously on the previously formed inner tube.

2. PRIOR ART

The application of the fiber glass reinforced plastic pipes have been recently increased and the production amount has also increased, however, when such a pipe is used as an embedding pipe, a stiffness factor enough to endure the outer pressure is required. It is known that the stiffness factor of a pipe is a product of Young's modulus E of the pipe and a secondary moment I of the cross-section of the pipe. The secondary moment I of the cross-section of the pipe is in proportion to the cube of a thickness H of the pipe. Accordingly, in order to obtain a high stiffness factor of a pipe, it is necessary to make the thickness of the pipe wall large. For this purpose, sandwich-shaped pipes wherein various materials are filled between an unsaturated polyester inner tube and an unsaturated polyester outer tube have been manufactured.

As this filling layer (core layer), use is made of a resin concrete which is a resin composition containing a large amount of a filler showing a high stiffness factor after hardening. However, the above described sandwich-shaped pipes are high in weight and are poor in workability in the jointing and embedding, and further, when the amount of resin concrete to be used increases, the cost is higher, and consequently fiber glass reinforced plastic pipes which are lighter, cheaper, and have a high stiffness factor have been demanded.

In addition, the resin concrete to be used as the filling layer of such composite pipes is in slurry form and in the manufacture of the above described sandwich-shaped composite pipes there are thus various production limitations. Namely, the conventional core layers have been formed by the following means: the core layer is formed while being sprayed and coated with a granular or paste-like resin concrete, or a slurry form of resin concrete is poured and is subjected to a centrifugal molding.

A process for molding the sandwich structure efficiently by laminating a slurry form of resin concrete or a woven fabric and the like to form a sheet and winding this sheet, has been recently known. However, in the molding of the resin concrete sheet a woven fabric is needed and a plurality of steps is necessary and further it is impossible to obtain a satisfactorily thick sheet. Accordingly, when a high thickness is required, the sheet must be wound in multi-layers and such a winding procedure is troublesome and expensive.

The present invention provides a method for producing fiber glass reinforced plastic composite pipes having a novel structure which can obviate the above described drawbacks. That is, the pipes of the present invention are composite pipes provided with a resin concrete rib which winds spirally around a fiber glass reinforced plastic inner tube (previously formed on a mandrel) at an appropriate pitch.

Corrugated pipes in which a corrugate-shaped reinforcing structure is provided on a flexible pipe, such as a hose or an iron pipe having a thin wall, have been heretofore known. In addition, a pipe maintaining its shape by combining such a corrugate-shaped pipe with a urethane foam has also been known.

However, the structure of the pipe according to the present invention is entirely different from that of the previously well-known pipes, and the stiffness factor is much higher than that of the conventional corrugated pipe as is shown in the following Example. In the production of the pipes having the structure of the present invention, the previously known process has not been able to provide the uniform product efficiently.

An object of the present invention is to provide a method for producing the highly rigid and light fiber glass reinforced plastic composite pipes which are provided with a resin concrete rib at a high efficiency.

SUMMARY OF THE INVENTION

The present invention consists in a method for continuously and efficiently producing highly rigid and light fiber glass reinforced plastic composite pipes provided with a resin concrete rib in which the structure is different from that of the conventional composite pipes having a sandwich structure.

The method for producing fiber glass reinforced plastic composite pipes provided with a resin concrete rib comprises:

1. Winding glass fiber threads impregnated with a thermosetting resin on a mandrel to form an inner tube,
2. Winding on said inner tube a resin concrete rib at an appropriate pitch, said resin concrete rib being prepared by compounding (a) 100 parts of an unsaturated polyester resin, (b) 0.5–10 parts of magnesium oxide, (c) 0.1–5 parts of a cross-linking agent, (d) 100–900 parts of a filler and (e) 0–30 parts of a diluting agent and simultaneously thickening the resulting mixture at a temperature of 20°–60°C and extrusion-molding the thickened mixture into a given size, and
3. Winding glass fiber threads impregnated with a thermosetting resin on the inner tube and the resin concrete rib to form an outer layer.

It has been found that the stiffness factor of the thus formed fiber glass reinforced plastic composite pipes provided with a rib depends upon the thickness of the rib corresponding to the thickness of the pipe wall as mentioned above.

The fiber glass reinforced plastic composite pipes provided with a resin concrete rib as in the present invention are much higher in stiffness factor than the hitherto known sandwich-shaped composite pipes using the same amount of resin concrete as in the composite pipes of the present invention. Furthermore, the composite pipes according to the present invention are much lower in weight than the sandwich-shaped pipes provided with a core layer having a thickness corresponding to the thickness of the rib. Moreover, the amount of the resin concrete to be used is smaller.

The resin concrete rib forming material according to the present invention can be extrusion-molded in an optional dimension by thickening the particularly defined composition of the components to be mixed a rubbery elasticity different from the conventional slurry form of resin concrete composition, so that the resulting rib forming material is very suitable for winding.

The height, width and winding pitch of the rib can be properly selected depending upon the use condition of the product.

BRIEF DESCRIPTION OF THE DRAWINGS

FIG. 1 shows a perspective view of the fiber glass reinforced rigid plastic pipe provided with a resin concrete rib according to the present invention; and FIG. 2 shows a cross-sectional view of the rib.

In these Figures, 1 shows a fiber glass reinforced plastic inner tube, 2 shows a resin concrete rib and 3 shows a fiber glass reinforced plastic outer layer.

DETAILED DESCRIPTION OF THE PREFERRED EMBODIMENTS

The inner tube and the outer layer forming the surface after winding the resin concrete are composed of glass fiber threads, a thermosetting resin and various additives, and are formed by a filament winding process.

The fiber glass reinforced plastic composite pipes provided with a resin concrete rib manufactured by the present invention have usually an inner diameter of 300–2,000 mm. Of course, it is possible to produce the pipes having a smaller diameter or a larger diameter than this range.

The resin concrete rib used herein is usually a trapezoid in cross-section, so that the winding can be easily effected, but various modified forms may be used depending upon the object. The size of the generally used rib has an upper side (a) of 10–40 mm, a lower side (b) of 30–60 mm and a height (h) of 5–25 mm in the trapezoid of the cross-section in FIG. 2. The pitch (p) of the winding on the inner tube is usually 60–80 mm, but these values may be designed optionally depending upon the use object and the strength of the product.

The thermosetting resin to be used herein is selected from unsaturated polyester resins, epoxy resins, phenolic resins, urethane resins and vinyl ester resins. Among them, unsaturated polyester resins and epoxy resins are preferable. These resins may be the same as or different from the resins to be used in the resin concrete. Particularly, in the case of production of corrosion resistant composite pipes, a corrosion resistant resin is used for the skin layer. As the additives, fillers, diluting agents, cross-linking agents, cross-linking accelerators and retarders to be used as the components of the resin concrete as mentioned hereinafter are properly selected.

Concerning the composition of the resin concrete, various compositions may be considered, but the resin concrete of the present invention comprises various unsaturated polyesters, magnesium oxide, cross-linking agents (hardening agents), fillers, diluting agents and the like, but since the resin concrete of the present invention is different from the conventional fluid resin concrete and is formed into a rib forming material, a specific device is made.

The unsaturated polyester resin to be used herein is selected from orthophthalic acid series polyester resins, isophthalic acid series polyester resins and bisphenolic A series polyesters.

Magnesium oxide to be used in the present invention acts in an important role for the formation of the resin concrete rib forming material. That is, magnesium oxide brings about a thickening effect given the particular composition of the resin concrete and the particular conditions, and therefore the molding into the rib form is achieved. As the magnesium oxide, ones having an active value of iodine adsorbing amount (I mg/MgO g) of 70–170 are preferable and I mg/MgO g of 100–150 is more preferable. This correlates to the crosslinking agent and further to the thickening degree of the rib forming material and the workability of efficiency. That is, when magnesium oxide having too low an activity is selected, the thickening does not proceed for a long time. Consequently, the hardening of the resin concrete itself may too proceed by the function of the cross-linking agent. And such a magnesium oxide is not desirable in view of the workability of efficiency.

An amount of magnesium oxide to be used is 0.5–10 parts per 100 parts of the unsaturated polyester resin.

As the cross-linking agents, use is mainly made of organic peroxides and as the cross-linking agents to be used in the resin concrete, the organic peroxides which harden the unsaturated thermosetting resins at a high temperature are effective. Namely, the peroxides of which the decomposition temperature for obtaining the half-value period in 10 hours is 50°–100°C are desirable, for example, 2,4-dichlorobenzoyl peroxide, t.butylperoxypyvalate, 3,5,5-trimethylhexanol peroxide, octanol peroxide, decanol peroxide, lauroyl peroxide, stearoyl peroxide, propyonol peroxide, succinic acid peroxide, acetyl peroxide, t.butylperoxy-2-ethylhexanoate, benzoyl peroxide, p-chlorobenzoyl peroxide, t.butylperoxyisobutyrate, 1,1-bis-t.butylperoxy-3,3,5-trimethylcyclohexane, t.butylperoxymaleic acid, t.butylperoxylaurate, cyclohexanone peroxide, t.butylperoxyisopropyl carbonate, 2,5-dimethyl-2,5-di(benzoylperoxy) hexane and the like.

The amount of these cross-linking agents to be used is preferably 0.1–5 parts per 100 parts of the unsaturated polyester resin.

On the other hand, the hardening rate of thermosetting resins forming the inner tube and the outer layer is preferred to be earlier than that of the resin concrete rib layer.

For this purpose, a combination of a rapidly hardening cross-linking agent and an accelerator is used as mentioned hereinafter.

For maintaining the workability, a small amount of retarder is used.

As the fillers for the resin concrete, use may be made of organic and inorganic fillers for general rubbers and plastics, for example, calcium carbonate, clay, talc, asbestos, silicate minerals, natural silicate, alumina hydrate, barium sulfate, calcium sulfate, metal powder, aluminum stearate, zinc stearate, cement, urea-formaldehyde resin, urea-phenolic resin, melamine-formaldehyde resin, saw powder, celluloses, carbon black, glass fiber and the like. Among them, when aluminum stearate or zinc stearate is mixed in an amount of 5–50% by weight based on the total amount of the filler, the strength of the resulting resin concrete rib forming material increases and the molding of the resin concrete rib forming material becomes easy.

The amount of the filler to be used in the present invention is preferably 100–900 parts per 100 parts of the unsaturated polyester, more preferably 200–500 parts.

As the diluting agents to be used in the present invention, use may be made of such substances that have compatibility with the above mentioned unsaturated polyester resins and are easily given reactivity by the following cross-linking agents and react with the unsaturated polyester resin to serve the curing. Namely, the diluting agents are selected from the compounds which are activated by usual vinyl monomers or organic peroxides. For example, these diluting agents are monomers, such as styrene, chlorostyrene, methyl methacrylate, ethyl methacrylate, butyl methacrylate, methyl acrylate, ethyl acrylate, butyl acrylate and the like, styrene-acrylonitrile copolymer, vinyl chloride-vinyl acetate copolymer, cellulose acetate butyrate, cellulose acetate propionate and the like.

These diluting agents may not be used, but in general it is preferable to use up to 30 parts per 100 parts of the unsaturated polyester resin.

The components, each having the above described range are mixed simultaneously by means of an extruder having a kneading effectiveness or among the above described components, the unsaturated polyester resin, magnesium oxide and the cross-linking agent are previously mixed and then the filler is added thereto and the resulting mixture is thickened at a temperature of 20°–60°C for 5–60 minutes, preferably 10–30 minutes while kneading, and then immediately the mixture is molded into a rib form through an extruder. The thus formed rib-shaped resin concrete does not yet advance hardening fully prior to the winding and shows an elasticity, and is very suitable for winding on the inner tube even at room temperature.

In this case, for the extrusion of the resin concrete into the rib-shape, a diaxial type extruder is preferred.

On the other hand, for the hardening of the inner tube and the outer layer, i.e., the skin layers, it is preferred to use the cross-linking agents which harden at a low or middle temperature. Because, after the composite pipe provided with the resin concrete rib according to the present invention is molded, the hardening begins from the skin layers and the generated hardening heat induces the hardening of the resin concrete in the rib.

In this case, the rib hardens, evolves heat and expands, and consequently the heated and expanded rib adheres with the skin layers closely. The outward deformation is restrained, the uniform-shape in the appearance is kept, the rib layer is not separated from the skin layers, the strength becomes high and a homogeneous product can be obtained.

As the cross-linking system for the skin layers to be used in the present invention, use is made of a combination of a cross-linking agent which hardens at a low or middle temperature and an accelerator, so that the cross-linking system hardens before than the cross-linking system of the rib layer.

The cross-linking agents to be used in the skin layers include dialkyl peroxides, diacyl peroxides, peroxyesters, hydroperoxides, percarbonates, alkylidene peroxides and the like, for example, methyl ethyl ketone peroxide, cyclohexanone peroxide, lauroyl peroxide, methylcyclohexanone peroxide, cumen peroxide, isopropyl ketone peroxide, benzoyl peroxide, t.butyl-peroxypivalate, t,butylperoxyneodecanoate and the like.

The important component which promotes the activity of the above described cross-linking agents is an accelerator. In order to cause the hardening of the cross-linking system of the skin layers before than that of the rib layer, the cross-linking agent is used together with an accelerator.

The accelerators include cobalt naphthenate, cobalt octenate, manganese octenate, vanadium pentoxide, tertiary amine series accelerators and the like.

In some combinations of the cross-linking agent with the accelerator, the resin composition to impregnate in glass fiber threads begins hardening during the molding of the skin layers by a filament winding process and the workability may be considerably lowered. Thus, the resin composition for the skin layers needs a certain time of pot life, usually about 2 hours and in some cases, a longer pot life may be required. Accordingly, a retarder is often used therewith. Furthermore, for the control of the heat evolved in the hardening of the skin layers and the rib layer, an appropriate amount of retarder is preferably used in the skin layers.

These retarders include quinones, hydroquinones, polyhydric phenols, amines, metal soaps and the like and among them quinones and polyhydric phenols are preferable.

The outer layer of the molded composite pipe may be finished by a surface mat, if necessary. In the composite pipe provided with the rib, which is formed continuously and efficiently, the skin layers are firstly hardened and then the rib layer is hardened. The appearance of the product is excellent, the inner structure of the skin layers, are not separated from the rib layer the product is homogeneous, and a satisfactory strength can be attained.

The following examples are given for the purpose of illustration of this invention and are not intended as limitations thereof.

The "part" used herein means "by weight."

EXAMPLE

A resin concrete composition mentioned hereinafter was kneaded and simultaneously thickened at 40°C in a kneader.

|  | Part by weight |
|---|---|
| Unsaturated polyester resin (orthophthalic acid series) | 100 |
| Magnesium oxide (active value 150) | 2.0 |
| Benzoyl peroxide | 1.0 |
| Filler calcium carbonate | 42.0 |
| Filler siliceous sand | 258.0 |
| Filler aluminum stearate | 5.0 |
| Styrene | 10.0 |

A releasing agent was applied on a mandrel having a diameter of 500 mm and glass fiber threads impregnated with a resin composition consisting of 100 parts by weight of an unsaturated polyester resin (orthophthalic acid series), 1.5 parts by weight of methylcyclohexanone peroxide, 0.7 part by weight of cobalt naphthenate, 0.15 part of retarder (NLC-10, made by Kayaku Noury Co., Ltd.) and 0.225 part of manganese octenate, were wound around the mandrel by a filament winding process to form a fiber glass reinforced plastic inner tube 1 having a thickness of 1.5 mm.

A rib forming material 2 obtained by molding the already kneaded and thickened (thickening time: 20 minutes) resin concrete composition into a geometrical shape, such as a trapezoid, in cross-section having a height of 17 mm, an upper side of 20 mm and a lower side of 40 mm through a diaxial extruder was wound spirally on the inner tube at a pitch of 80 mm.

Then, the glass fiber threads impregnated with the resin composition, which were used in the formation of the above described inner tube, were wound thereon by a filament winding process to a thickness of 1 mm to form an outer layer 3.

The thus formed fiber glass reinforced plastic composite pipe provided with the resin concrete rib was subjected to a strength test in comparison with a usual sandwich-shaped pipe having the same diameter as in the above composite pipe made of the same resin concrete as described above (thickness of resin concrete: 10 mm, the amount of the resin concrete used is 1.5 times of that in the above described composite pipe provided with the rib), a composite pipe in which an urethane foam rib is provided in place of the resin concrete rib having the same diameter as in the above described composite pipe and a Hume concrete pipe (product defined by JIS) having the same inner diameter as in the above composite pipe.

Namely, each pipe having an inner diameter of 500 mm was cut in a length of 400 mm and an outer pressure was applied on each sample in the diameter direction by Amsler testing machine to determine the breaking strength. The obtained results are shown in the following Table.

| Pipe | Breaking strength (Kg/m) | Unit weight (Kg/m) |
| --- | --- | --- |
| Pipe in the present invention | 4,250 | 35 |
| Sandwich-shaped pipe | 4,125 | 40 |
| Pipe provided with urethane foam rib | 2,700 | 30 |
| Hume concrete pipe | 3,000 | 230 |

As seen from the above data, the composite pipe provided with the resin concrete rib according to the present invention is superior to the conventional sandwich-shaped pipe in the breaking strength, even if the amount of the resin concrete is about 2/3 of the sandwich-shaped pipe. Moreover, the weight is smaller and the workability, such as embedding, is much better.

The pipe provided with the urethane foam rib and Hume concrete pipe are considerably inferior to the composite pipe provided with the resin concrete rib according to the present invention in breaking strength.

Furthermore, the Hume concrete pipe is very high in unit weight (the total weight is 6.6 times that of the composite pipe of the present invention) and is poor in workability.

What is claimed is:

1. A light and rigid fiber glass reinforced plastic composite pipe comprising (1) an inner tube formed by winding glass fiber threads impregnated with a thermosetting resin on a mandrel by a filament winding process, (2) a geometrically shaped rib spirally wound round the inner tube, said rib being produced by mixing 100 parts by weight of a unsaturated polyester resin, 0.5–10 parts by weight of magnesium oxide, 0.1–5 parts by weight of a cross-linking agent, 100 to 900 parts by weight of a filler and 0–30 parts by weight of a diluting agent and simultaneously thickening the mixture at a temperature of 20°–60°C, and extrusion molding the thickened mixture, said rib being ultimately hardened, and (3) an outer layer covering the inner tube and the rib, said outer layer being composed of said glass fiber threads impregnated with a thermosetting resin.

2. The pipe as claimed in claim 1, wherein said magnesium oxide has an active value (iodine adsorbing amount) of 70–170 (I mg/MgO g).

3. The pipe as claimed in claim 1, wherein said unsaturated polyester resin is selected from the group consisting of orthophthalic acid series polyester resin, isophthalic acid series polyester resin and bisphenolic resin.

4. The pipe as claimed in claim 1, wherein said thermosetting resin used in the inner tube and the outer layer is selected from the group consisting of an unsaturated polyester resin, an epoxy resin, a phenolic resin, a urethane resin and a vinyl ester resin.

5. The pipe as claimed in claim 1, wherein said cross-linking agent in said rib is an organic peroxide.

6. The pipe as claimed in claim 1, wherein the inner tube and the outer layer contain a cross-linking agent which is an organic peroxide.

7. The pipe as claimed in claim 1 wherein the rib is hardened after being wound around the inner tube.

8. The pipe as claimed in claim 1 wherein the rib is a trapezoid in cross section.

9. The pipe as claimed in claim 1, wherein said diluting agent is selected from styrene, chlorostyrene, methyl methacrylate, ethyl methacrylate, butyl methacrylate, methyl acrylate, ethyl acrylate, butyl acrylate and the like, styrene-acrylonitrile copolymer, vinyl chloridevinyl acetate copolymer, cellulose acetate butyrate, cellulose acetate propionate and the like.

* * * * *